United States Patent [19]
Michaud et al.

[11] 3,805,036
[45] Apr. 16, 1974

[54] ARRANGEMENT FOR A COLUMNAR DISPLAY OF VARIATION GAGING SIGNALS

[75] Inventors: Jimmie A. Michaud, Bellbrook; Jack R. Stroman, Kettering, both of Ohio

[73] Assignee: The Bendix Corporation, Southfield, Mich.

[22] Filed: Sept. 5, 1972

[21] Appl. No.: 286,500

[52] U.S. Cl........ 235/151.32, 33/174 L, 324/103 P, 340/366 R
[51] Int. Cl............................................. G06f 15/46
[58] Field of Search....... 235/151.11, 151.3, 151.32; 324/73 R, 73 AT, 103 P; 33/168 R, 169 B, 174 R, 174 L; 73/104, 105; 340/366 R, 381

[56] References Cited
UNITED STATES PATENTS

| | | | |
|---|---|---|---|
| 3,665,169 | 5/1972 | Henderson et al. | 235/151.3 |
| 3,337,845 | 8/1967 | Hart | 340/381 X |
| 3,703,337 | 11/1972 | Neugroschel et al. | 324/103 P X |
| 3,650,036 | 3/1972 | Coveney et al. | 33/174 L X |
| 3,480,912 | 11/1969 | Speeth et al. | 340/366 R X |
| 2,845,597 | 7/1958 | Perkins | 324/103 P |

Primary Examiner—Eugene G. Botz
Assistant Examiner—Jerry Smith
Attorney, Agent, or Firm—John R. Benefiel

[57] ABSTRACT

An arrangement is disclosed producing a columnar display of variation data developed during workpiece gaging operations, including electrical gaging transducers for sensing dimension variations at points on surfaces of a workpiece, an analog to digital converter converting electrical analog gaging signals to digital form, and also including a digital computation network which may be selectively set to compute either the variation in each of a number of gaging signals each produced by an individual gaging transducer, or the maximum variation occurring in all of these individually produced gaging signals, or the difference between the minimum and maximum values of all of the gaging signals produced. These computed values are outputted in the form of digital signals which are decoded so as to activate individual indicator elements in a vertical series of electrically activated indicator elements, with a single indicator element activated in the series for each digital signal level such that the relative vertical position of the activated indicator element corresponds to the relative level of the digital signal to yield a columnar display of the variation data described.

8 Claims, 4 Drawing Figures

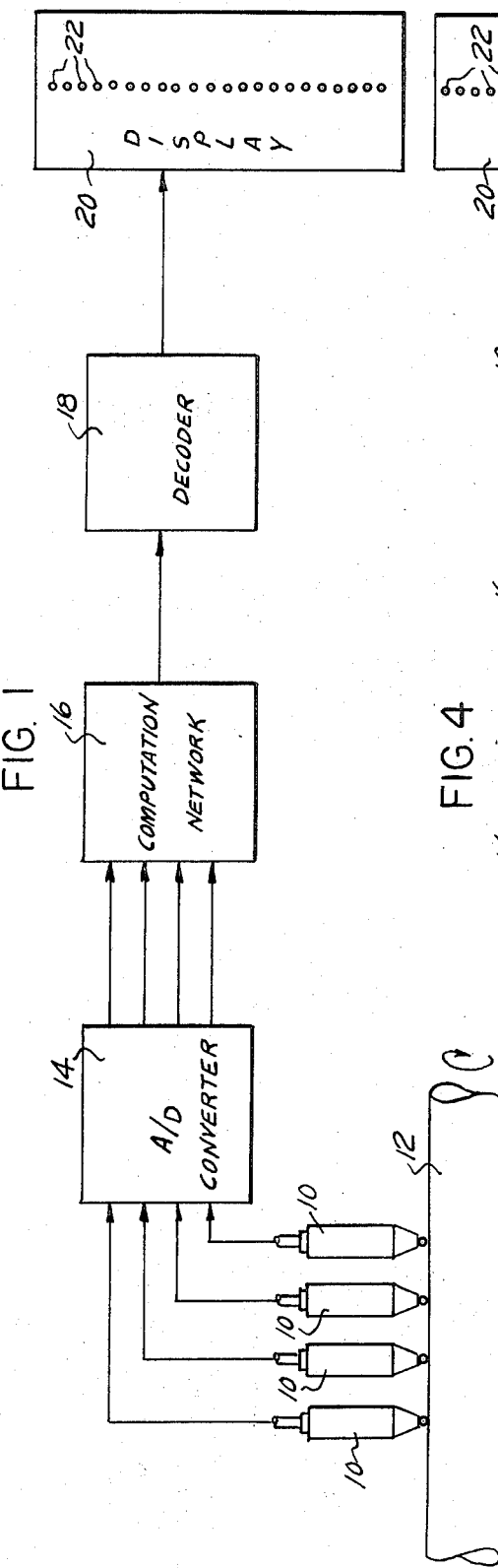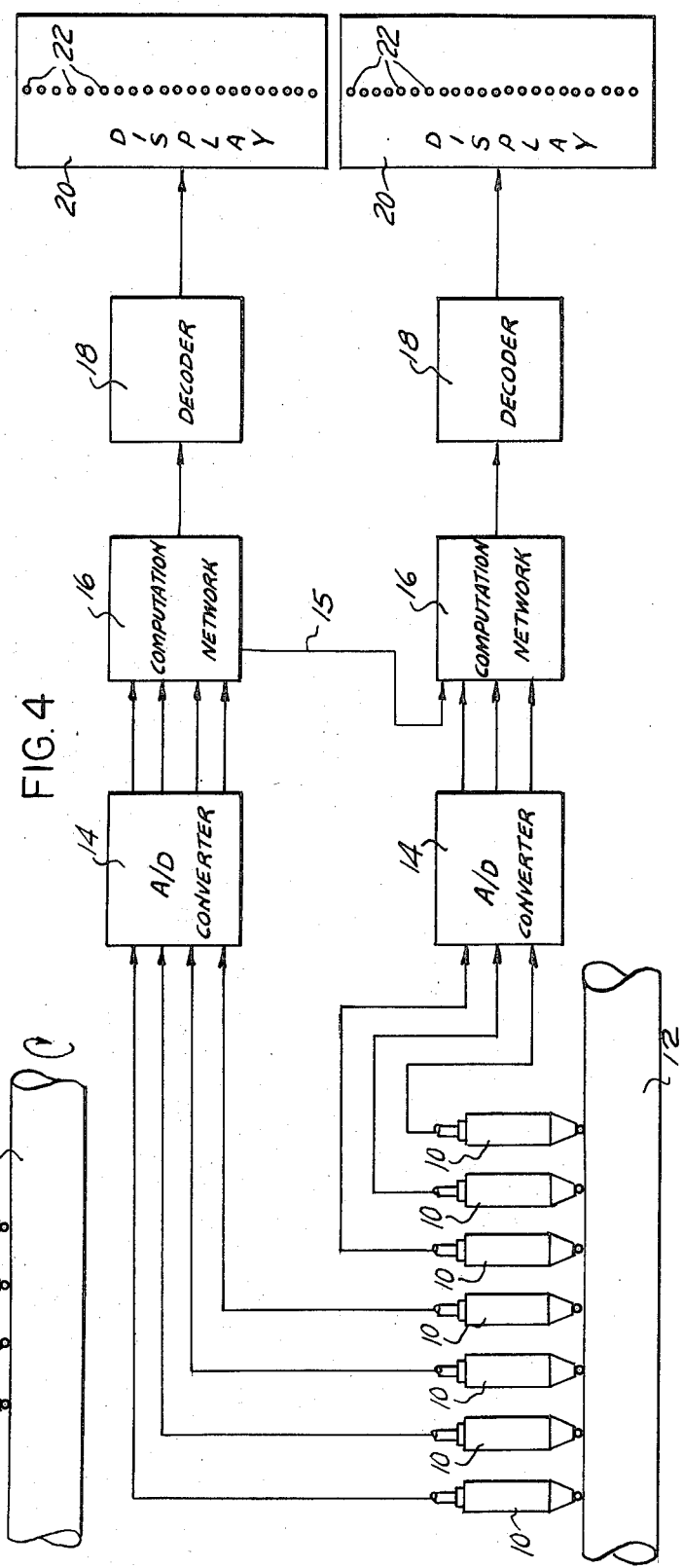

ARRANGEMENT FOR A COLUMNAR DISPLAY OF VARIATION GAGING SIGNALS

BACKGROUND OF THE INVENTION

1. Field of the Invention

This invention concerns gaging apparatus, and more specifically concerns an arrangement for displaying variations in the surfaces of workpieces.

2. Description of the Prior Art

Mass production of precision products such as automotive engine components has long involved the use of column type air flow gaging which are capable of measuring part dimensions to very close tolerances rapidly and reliably. In this type of gaging, a float is suspended at various levels in a vertical tube depending on the value of the dimension measured, and by locating a pair of limit indicators at the upper and lower positions corresponding to the upper and lower dimension tolerances, it is very easy for an operator to rapidly and reliably ascertain if the dimension is within these limits. Where a number of dimensions are to be checked, it has been the practice to gang such instruments to allow visual scanning of a number of part dimensions, which the column type display greatly facilitates as an operator can very rapidly scan a number of these instruments when the display is in this form.

However, in one area, this type of gaging has suffered from a distinct disadvantage, and this is in the determination of "variation" type gaging data. Variation data commonly takes the form of the difference between the maximum and minimum values of those sensed by a single gaging transducer (such as caused by a shaft out of round condition) or the maximum variation of several of such values sensed by a plurality of gaging transducers (as the maximum out of round condition of several checked points along a shaft), or occasionally the difference between the minimum and maximum values of all the dimensional values sensed by a number of gaging transducers (to determine straightness or flatness either statically or dynamically).

Heretofore, this gaging information has not been displayed in a form compatible with such column displays, and in typical column air gaging set-ups, the operator was forced to scan the individual columns displaying the dimensional variations and himself compute the variation or difference data from the individual displays, a time consuming and unreliable procedure, particularly for gaging data generated by rotating or moving a part, since the operator was forced to attempt to remember the maximum excursion noted.

Although such data has heretofore been computed automatically in automatic gaging machines and displayed in different forms, and some limited applications in analog electrical gaging with a meter display have been used, no system directly displaying such data in columnar form has existed.

Due to its widespread use and the fact that gage operators in industries using column air gaging have become accustomed to such displays, it would thus be advantageous if an arrangement to provide such a display for this information were available.

Accordingly, it is an object of the present invention to provide an arrangement which displays variation or difference type gaging data in columnar form.

SUMMARY OF THE INVENTION

This and other objects which will become apparent upon a reading of the following specification and claims are accomplished by a variation display arrangement which displays such data in columnar form. The preferred embodiment utilizes a plurality of electrical gaging tranducers which provide variable level electrical analog gaging signals corresponding to the sensed relative position of workpiece surfaces, an A/D converter converting these signals to digital form, a computation network which selectively computes and outputs either the variation value defined as the difference between the maximum and minimum of the gaging signals produced by selected individual transducers, or the maximum variation in gaging signals produced by the individual gaging transducers or the overall maximum difference defined as the difference between the maximum value of all of the gaging signals produced by the plurality of gaging transducers and the minimum value of the gaging signals of all the signal values produced by the plurality of gaging transducers.

Each value of the outputted digital signal is decoded to be displayed by changing states of one of a vertical series of electrically activated indicator elements, the relative vertical position of the indicator element which changes states corresponding to the value of the signal outputted from the computation network to thus provide a columnar display of this gaging information.

An arrangement is also provided for cascading these arrangements to provide an overall maximum difference display of several series of such gaging transducers by inputting alternately the maximum and minimum gaging signal values of one series to the input of the computation network of a second arrangement together with inputs from its own associated group of gaging transducers to produce a display of the overall maximum difference of all of the gaging signals.

DESCRIPTION OF THE DRAWINGS

FIG. 1 is a a block diagram representation of the basic arrangement according to the present invention.

FIG. 4 is a block diagram representation of a cascading of the arrangements according to the present invention.

DETAILED DESCRIPTION OF THE PREFERRED EMBODIMENT

Figure 2:
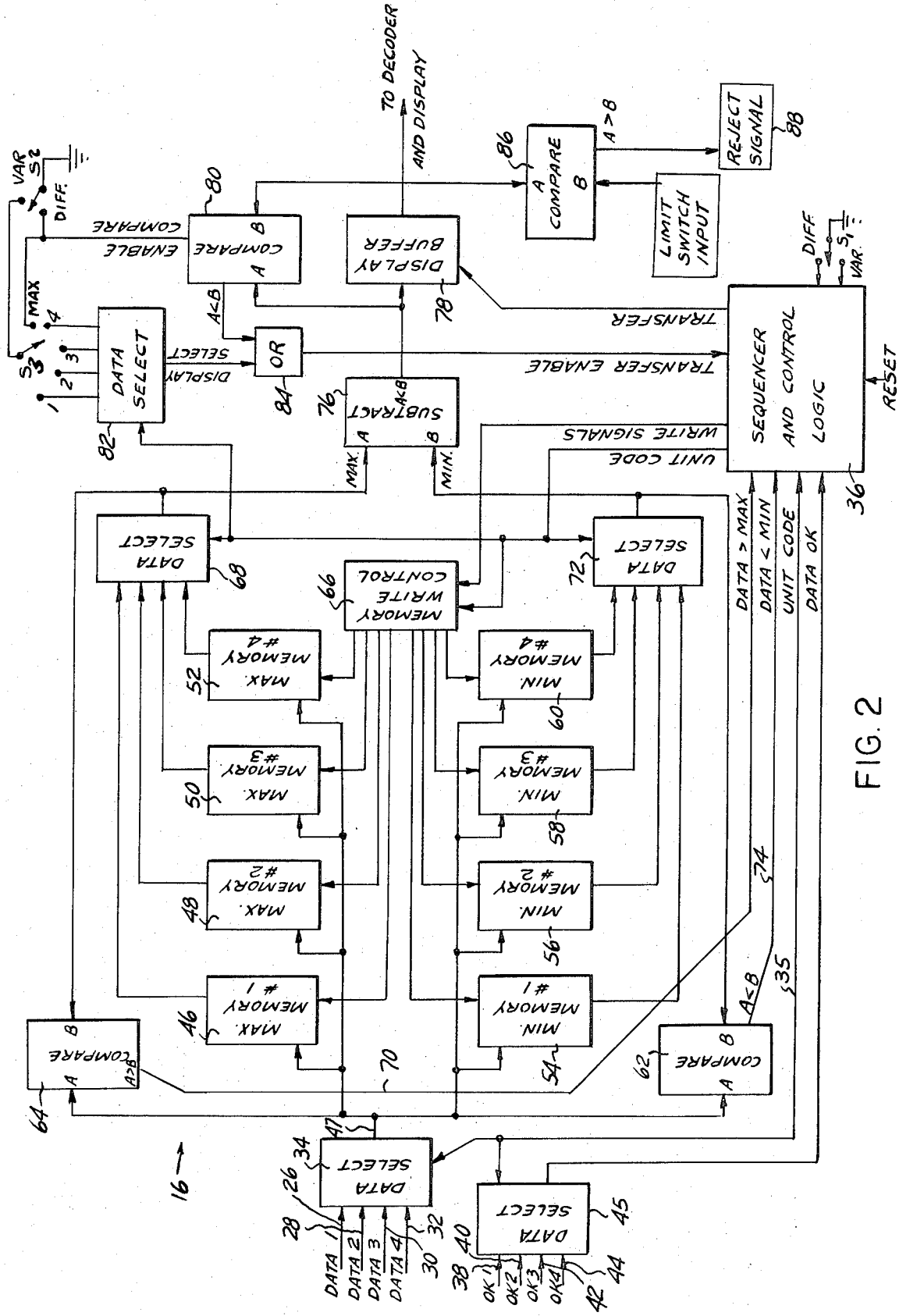
FIG. 2 is a block diagram representation of a computation network suitable for incorporation in the arrangement according to the present invention.

In the following detailed description certain specific terminology will be utilized for the sake of clarity and a specific embodiment will be described in order to provide a complete understanding of the invention, but it is to be understood that the invention is not so limited and may be practiced in a variety of forms and embodiments.

Referring to the drawings and particularly FIG. 1, the basic arrangement according to the present invention is depicted in block diagram form, and includes a plurality of electrical dimensional gaging transducers 10 which produce electrical analog signals corresponding to the location relative the gaging transducers 10 of points on a surface of a workpiece 12, shown in FIG. 1 as the OD of a shaft.

As the gaging transducers 10 are moved relative the surface of the workpiece 12 (as by rotating the shaft), signals corresponding to the relative position of the workpiece 12 gaged surface with respect to the gaging transducers 10 are thus continuously produced so that the workpiece 10 dimensional values with respect to this surface can be measured.

On the other hand, in a static test as is often used in flatness or straightness checks no relative movement occurs between the gaging transducers 10 and the workpiece 12 and the differences in gaging transducer signals produced by gaging transducers 10 in the series are used to gage the part, rather than the variations in each gaging transducer 10 readings.

These gaging transducers 10 could be of the well known differential transformer type which is suitable for typical gaging applications.

Each of the analog signals generated is converted into digital form by an A/D converter 14, so that a series of digital (typically binary) signals is presented to a computation network 16.

The computation network 16 comprises computation means which selectively computes and outputs digital signals corresponding to either the dimensional variation sensed by a selected one of the gaging transducers 10, or the greatest variation sensed by any one of the gaging transducers 10, or the maxumum difference sensed by the series of gaging transducers 10, defined as the difference between the overall maximum and minimum of all of the gaging signal values produced by the plurality gaging transducers 10.

The digital signal outputted is then decoded in a decoder network 18, and displayed in a display 20, which together provide a display means such that the state of an individual indicator element of a vertical series of indicator elements 22 is changed preferably by being activated, for each change in the output signal value so that the relative position of the activated element in the series corresponds to each digital value generated by the computation network 16. That is, this decoding is such that for increasing digital values, indicator elements in successively higher relative positions in the series are activated and contrariwise indicator elements in successively lower relative positions in said series are activated for decreasing digital values.

Thus, it can be appreciated that a columnar type display for the computed variation and/or difference gaging data has been provided which can be grouped with columns displaying gaging transducer signals directly to provide a gaging system in which all of the gaging data is displayed directly in columnar fashion.

An arrangement wherein there is provided a direct display of the gaging transducer is disclosed in U.S. Patent Application Ser. No. 243,649 filed April 13, 1972 assigned to the assignee of the present application.

Inasmuch as the gaging transducers 10 and suitable A/D converters are well known in the art, a detailed description of these will not be included here.

Referring to FIG. 2, a combinational logic network 24 implementation of the required computation functions is depicted in block diagram form. This particular implementation is shown and described herein, as this form is the most readily understood and most clearly demonstrates the concept, although it will be understood by those skilled in the art that other approaches such as serial networks in which the data is handled in the form of pulse trains may also be utilized and for many applications may be superior for reasons known to those skilled in this art, such as lessened circuit power requirements.

This network 24 receives gaging signals from the A/D converter via inputs 26, 38, 30, and 32, each of which consists of six lines to provide the gaging signal in the form of a six bit binary digital word.

The transmission of each six bit binary word to the network 24 is controlled by a data selection multiplexer 34, in turn controlled by a sequencer and control logic circuit 36, which provides unit code control signals to the multiplexer 34 over line 35 such that each of the words on lines 26, 28, 30 and 32 are successively allowed to be transmitted to the rest of the circuit.

A ready enablement signal for each line is also generated and presented over lines 38, 40, 42 and 44 when the six bit word on the data line to be communicated with the network 24 is in condition for reading, as typical A/D converters have a digital signal ready for reading only at certain intervals and thus to prevent false readings, the transmission of the six bit word is not allowed until an enablement signal read through at multiplexer 45 also controlled by the unit code control signals transmitted via line 35 is presented.

Figure 3:
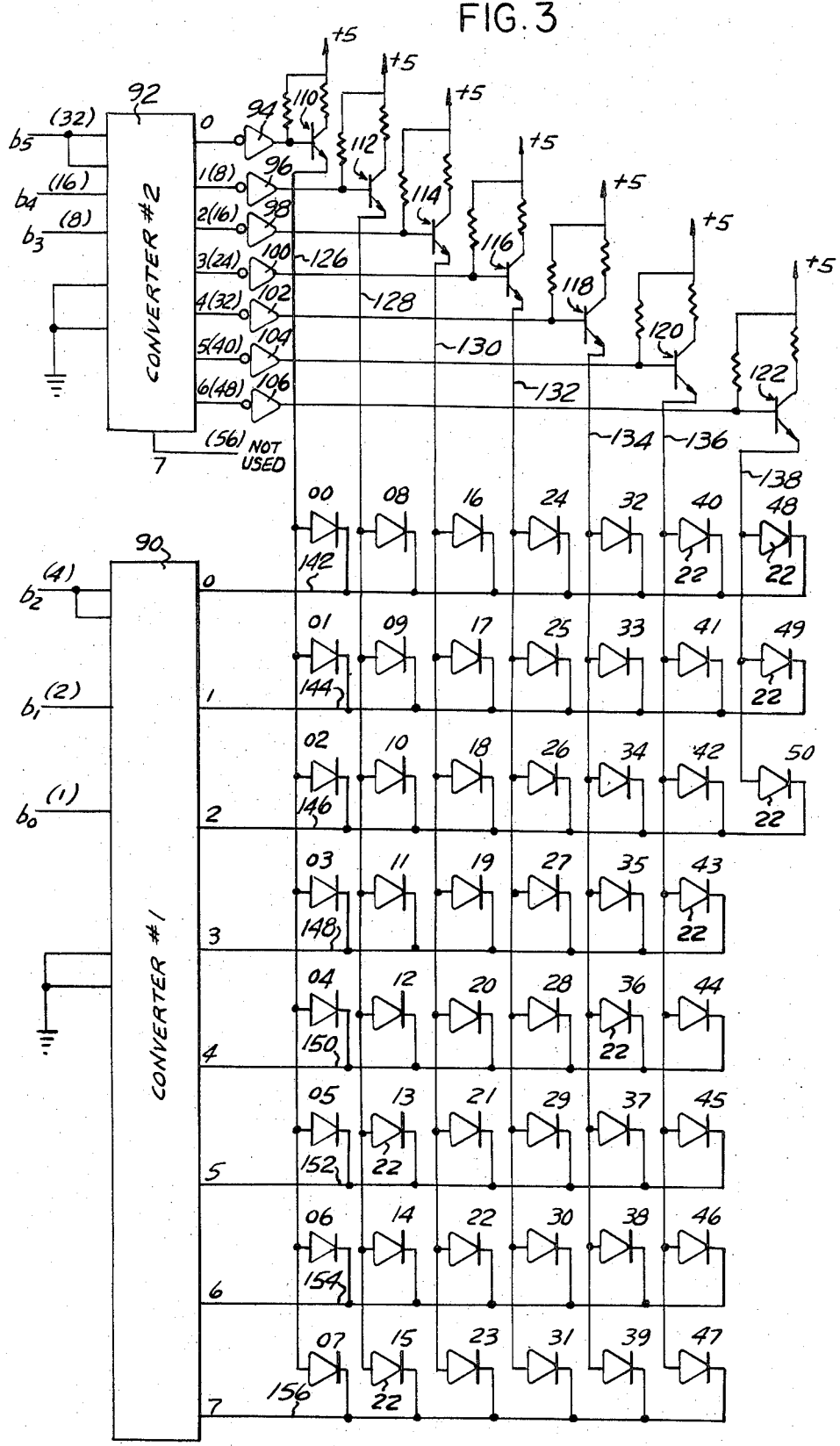
FIG. 3 is a schematic diagram of a decoding network and associated indicator element series suitable for incorporation in the arrangement according to the present invention.

Each signal thus allowed to be transmitted by the multiplexer 34 is presented via input 47 to memory means for storing gaging signals produced by individual gaging transducers 10 during gaging movements and comprises a series of memory units 46, 48, 50 and 52, labelled in FIG. 3 as Max Memory No. 1, No. 2, No. 3, and No. 4, respectively, and also a series of memory units 54, 56, 58, and 60 labelled as Min Memory No. 1, No. 2, No. 3, and No. 4, respectively, as well as to one side of comparators 62 and 64.

Each of the MAX Memory No. 1 – No. 4 and the MIN Memory No. 1 – No. 4 comprise a No. 1 – No. 4 memory sets.

This word thus presented is not, however, written into any of the memory units until enabled to do so by a memory write control circuit 66 which in turn is also controlled by the sequencer and control logic 36, so that the word is only written into a memory unit of one of the memory sets, the particular one of which depends on the selected mode of operation, and the particular unit code control signal present, and in addition is only written into the particular memory unit within the set if an output of either the comparators 62 or 64 is present.

In the "Variation" mode, in which the variations of the dimensional values read by a respective gaging transducer 10 are computed, a switch S1 is set to the "VAR" position which causes unit control signals to be transmitted to the memory write control circuit 66 so that each of the memory sets No. 1, No. 2, No. 3, No. 4 are successively activated in synchronism with the presentation of respective data on inputs 26, 28, 30 or 32 via multiplexer 34, but only if the output of the comparators 62 or 64 allows it to do so.

One input of comparator 64 receives the word transmitted by multiplexer 34, while the other input reads the word stored in a respective one of Max memory units No. 1 – No. 4 by means of a multiplexer 68, also controlled by unit code control signals received from sequencer and control logic 36.

Comparator 64 functions as a "greater than" comparator, that is, an output signal is generated only when the word read over input 47 is greater than that read out of the memory units 46 – 52.

Initially in the reset condition each of the memory units 46, 48, 50 and 52 is set to zero so that the comparator 64 compares the word on input 26 with zero.

Thus, if any word other than 000000 is read on input 47, a comparator output signal is produced which is read via line 7 into the sequencer and control logic 36 which in response thereto, allows the word presented on input 42 to be written into memory unit 46.

One input of comparator 62 receives the word transmitted via input 47 while the other reads the word stored in a respective one of Min memory units No. 1 – No. 4 by means of a multiplexer 72 controlled by the unit code control signals received from sequencer and control circuit 36.

Comparator 62 functions as a "less than" comparator, producing an output only when the word read via input 47 is less than the word read from the respective one of the memory units 54 – 60.

Initially, each of the memory units 54 – 60 is reset to contain the maximum storage capacity, so that for any binary word less than the storage capacity of these units comparator 62 will produce an output signal transmitted to the sequencer and control logic 36 via line 74 which in response thereto allows the word on input 47 to be written into memory unit 54.

In subsequent comparisons, with regard to the No. 1 memory sets, the word on input 47 is compared with the previously stored value in memory units 46 and 54 and if it is greater than that in memory unit 46, it will be written into memory unit 46, and if it is less than that in memory unit 54, it will be written into memory unit 54, so that signals corresponding to the maximum and minimum dimensional values sensed successively by a corresponding individual gaging transducer 10 as the workpiece 12 and gaging transducer 10 are relatively moved are constantly stored.

As each unit code control signal is sequenced, a similar process subsequently takes place with each of the memory sets No. 2, No. 3 and No. 4 successively and then the sequence repeats, so that gaging signals corresponding to the maximum and minimum signals sensed by a respective gaging transducer 10 are constantly stored in a respective memory set.

In the "Difference" mode, the difference between the minimum and maximum of all the signals sensed is to be computed without regard as to which gaging transducer 10 senses the minimum or the maximum, and in this mode switch $S_1$ is set to the "DIFF" position. In this position, the unit code signals are produced which call only for multiplexing of the No. 1 memory set regardless of the respective word multiplexed in by multiplexer 34 which continues to successively transmit words on inputs 26, 28, 30 and 32 is successively compared with the contents of memory units 46 and 54, the overall maximum and minimum of all the signals produced is thus stored, rather than the maximum and minimum of the gaging signal values sensed by an individual gaging transducer 10.

The gaging signal "variation" or "difference" is computed by subtracting the maximum and minimum values so generated in a subtractor 76, which outputs the difference in these signal values.

It is noted that in the event of a "static" gaging setup, in which no relative motion of the workpiece 12 and gaging transducer 10, there will be no variation in the gaging signals produced by each gaging transducer 10, and in the Difference mode the difference between the maximum and minimum of all of these static readings will thus be computed by this arrangement.

The result of this subtraction is then presented to a display buffer register 78 prior to transmission to the decoder 18 and display 20.

The transfer of the output of the subtractor 76 into the display buffer register 78 is controlled by the combination of a comparator 80, a pair of switches $S_2$ and $S_3$ which are selectively set in different positions depending on the mode of operation, a multiplexer 82, an OR gate 84, and the sequencer and control logic 36.

In the difference mode, switch $S_2$ is set to the position DIFF shown, which grounds the comparator 80 to effect an enablement thereof. In this condition, the value of each incoming word is compared with the value of the previous word stored in the display buffer register 78 and if the new value is greater, comparator 80 outputs a "low" logic signal to OR gate 84 which in response thereto then outputs a transfer enable signal to sequencer and control logic 36 which in turn generates a transfer signal to the display buffer register 78 to read in the new word which is then decoded and displayed.

In the variation mode, Switch $S_2$ is set to the VAR position shown, and in addition Switch $S_3$ is set either to a position corresponding to an individual gage transducer (identified as positions 1, 2, 3 or 4) or to the maximum variation position identified as MAX in FIG. 2.

The multiplexer 82 successively connects each of the positions 1, 2, 3 and 4 to the internal inputs to which the unit code signals generated by the sequencer and control logic 36 are transmitted, as well as successively connecting these inputs to the multiplexer output which is connected to the OR gate 84, Thus, a "high" state is read at the OR gate for each unit code of the control signal except for that unit code signal corresponding to the selected position 1, 2, 3 or 4 which is conducted via switches $S_2$ and $S_3$ to ground, causing a "low" input to the OR gate 84 to produce a transfer enable signal therefrom and thus a transfer of the contents to the display buffer register 78.

As the comparator 80 is not enabled during this period, no comparator output signal is produced regardless of the relative values of the incoming and stored words.

With selector switch $S_3$ set at the MAX position (and $S_2$ still set at the VAR position) the comparator 80 is connected to ground via these switches and thus is enabled, so that the display buffer register 78 displays only the greatest of the individual variations to produce this mode of operation.

In addition, each of the values stored in display buffer register 78 is compared in a comparator 86 with a selectively set limit value, which if exceeded, triggers a reject indicator 88.

FIG. 3 depicts the decoder 18 in schematic form which is arranged to read and decode the six bit binary word received from the display buffer register 78 and activate corresponding individual indicator elements 22.

At the outset, it is noted that a six bit binary word is capable of representing 0–63 increments, however, for most purposes, a scale comprised of 51 increments is adequate, allowing for a 0–50 increment variation range. Thus, the decoder 18 is arranged to drive a respective indicator element for binary numbers 00 through 50.

The decoder 18 includes octal converters 90 and 92 which have inputs connected to the output of the display buffer register 78 such that the lowest three digits of the binary number $b_0$, $b_1$, and $b_2$ are connected to octal converter 90 and the highest three digits $b_3$, $b_4$, and $b_5$ are connected to octal converter 92. Octal converter 92 is conventional in the sense that for various binary numbers 0–7 represented at the inputs by the upper three digits $b_3$, $b_4$, and $b_5$ representing the 8, 16 and 32 orders of the output signal, a respective output 0–7 goes to the low state. Octal converter 90 on the other hand is internally connected so that for each binary number 0–7 represented at the input terminals by the lower three digits $b_0$, $b_1$ and $b_2$, a respective output 0–7 is connected to ground.

It is noted that since the outputs 0–7 of the octal converter 92 represent decimals 0, 8, 16, 24, 32, 40, and 56, only outputs 0–6 are necessary to represent the 0–50 increment range and thus each of the outputs 0–6 of octal converter 92 is connected to inverters 94–106 and junction transistors 110–122 so that if a respective output 0–6 is "low" the corresponding junction transistor is turned on to apply a potential to the respective emitter line 126–138.

The emitter lines 126–138 each are connected to the anodes of groupings of indicator elements 22 which preferably take the form of light emitting diodes (LED's) as shown, the emitter line 126 corresponding to the 0 output connected to the 00 through 07 LED (corresponding to 0–7 on the scale), the emitter line 128 connected to LED's 08–15, (corresponding to 8–15 on the scale) emitter line 130 connected to LED 16–23 (corresponding to 16–23 on the scale) and so on as shown.

Each of the outputs 0–7 of octal converter 90 on the other hand is connected to lines 142–156 respectively which connect the cathodes of LED's 22 in the groupings shown in FIG. 3.

These connections cause a respective LED 22 designated by decimal 00–50 to emit when the equivalent binary number $b_0 - b_5$ is read at the octal converter 90 and 92 inputs. For example, if binary 000111 equal to decimal 7 is read out of the display buffer register 78 $b_3$, $b_4$, and $b_5$ are at zero, while $b_0$, $b_1$, and $b_2$ are at 1. Thus, all of the outputs of the octal converter 92 are "high" or at a logic one except the zero output which causes a potential to be applied to emitter line 126 which is connected to the 07 LED.

Since $b_0$, $b_1$, and $b_2$ are all high for binary 000111, line 156 only is connected to ground, to thus cause the 07 LED to emit since this completes the circuit thereto. While 156 also connects the 15, 23, 31, 39 and 47 LED's to ground, these do not have a potential applied to the anode, hence none of these emit, so that for binary 000111 only the 07 LED emits. Taking a second example, binary 000100 equal to decimal 8 since $b_3$ is equal to 1 and $b_4$ and $b_5$ are equal to zero, only the 1 output is low, causing the line 128 alone to be energized, applying a potential to the 08–15 LED's. However, for binary number 000100, $b_0$, $b_1$, and $b_2$ are all zero so that only line 142 is connected to ground. Thus, only the 08 LED is activated because the circuit is complete only for this LED.

The net result is that for each binary number 00–50 read at the inputs of octal converters 90 and 92, a single respective LED 00–50 as indicated has potential applied to its anode and its cathode to ground to cause it to emit.

As noted, these LED's are arranged physically on the instrument in vertical sequence with the 00 LED being lowest and the 50 LED being highest.

It can be appreciated that this matrix of connections with the two octal converters 90 and 92 in effect provide a conversion means for converting a six bit binary number into an output pattern of "states" at points in the matrix unique to each binary number, these "states" comprising completed circuits at each point to thus provide a decoding of the binary number and driving of each corresponding LED 22.

Thus, as the computed value of the difference or variation in the gaging signal or signals increases the LED's 22 are consecutively activated upwardly at incremental values thereof, and similarly as the computed value decreases the LED's 22 are consecutively activated downwardly. It will, of course, be understood that if a subsequent computed value varies by several increments, a subsequent LED 22 in one direction or the other (i.e., upwardly or downwardly) will be activated rather than a strictly consecutive activation. Since the decoder 18 provides for only a single activated LED 22, any preceding activated LED 22 is deactivated as the individual LED 22 corresponding to the computed value is activated, so that in this embodiment only a single LED 22 is activated for a given computed variation or difference value, and its relative position in the vertical series provides an indication of the relative value of the variation or difference computed.

Referring to FIG. 4, an arrangement for cascading the arrangements according to the present invention is depicted, in which in the difference mode a single display indicates the overall difference for a number of gaging transducers 10 greater than the capacity of any one arrangement.

In this arrangement, the readings of a first group of gaging transducers 10 are processed in a first variation display arrangement the same manner to produce, in the difference mode, an outputted computed difference value from the computation network 16. However, in this mode the overall maximum and minimum values are alternately presented to an output 15 which then can be connected to an input to the computation network of a second variation display arrangement, which also has a second group of several gaging transducers 10 inputted thereto. By this arrangement, the difference between the minimum and maximum of all of the values sensed by both groups of gaging transducers 10 is displayed in the display 20 of the second variation display arrangement.

Further cascading could easily be carried out to measure flatness, for example, of very large workpieces.

Accordingly, it should be appreciated that a display of variation and difference gaging data has been provided which displays such data in columnar form, to thus be compatible with columnar displays of other gaging data.

Many alternate implementations of the disclosed embodiment are, of course, possible within the scope of the present invention.

I claim:

1. A gaging arrangement for gaging workpiece dimensional characteristics comprising:

gaging means sensing the location of a workpiece surface relative said gaging means including gaging transducer means successively producing corresponding gaging signals at at least two points on said workpiece;

memory means for storing said corresponding gaging signal values produced by said gaging transducer means and further including means comparing said gaging signals successively produced by said gaging transducer means so that signal values corresponding to the maximum and minimum of said gaging signals produced by said gaging transducer means are stored by said memory means;

means computing the difference between said maximum and minimum gaging signal values and producing an output signal corresponding to said difference; and display means providing a columnar display of said output signal.

2. The gaging arrangement of claim 1 wherein said gaging means includes a plurality of gaging transducers each measuring points along said workpiece and wherein said memory means produces said minimum and maximum stored values of said gaging signals produced by each of said plurality of gaging transducer means, and wherein said means computing said difference computes the difference between each of said maximum and minimum values and produces a corresponding output signal, and further including comparison means selectively causing the maximum of said difference output signals to be displayed by said display means.

3. The gaging arrangement of claim 2 further including means for computing the difference between the maximum gaging signal produced by any of said plurality of gaging transducers means and the minimum gaging signal produced by any of said plurality of gaging transducer means, and producing an output signal corresponding thereto, and further including means for selectively displaying said output signal by said display means.

4. The arrangement of claim 3 further including a second gaging arrangement, and also including a plurality of gaging transducer means and means for transmitting the output signal corresponding to said maximum and minimum of said gaging signals of said first gaging arrangement to said second gaging arrangement and means for selectively computing the difference between the maximum gaging signal produced by said plurality of gaging transducer means of said first and second gaging arrangement in the minimum gaging signal produced thereby and producing a corresponding output signal and means causing said display means to display said output signal.

5. The gaging arrangement of claim 1 wherein said display means includes a vertical series of indicator elements, and wherein said output signals are in digital form, and wherein the occurrence of each digital output signal value causes an individual indicator element to change state.

6. The gaging arrangement of claim 5 wherein said display means includes means for consecutively activating individual indicator elements in said series in response to the occurrence of consecutive digital values of said output signal.

7. The gaging arrangement of claim 6 wherein said means for consecutively changing states of said individual indicator element includes means consecutively activating said individual indicator elements consecutively upwardly with increasing digital values of said output signal and downwardly with decreasing digital values of said output signal.

8. The gaging arrangement of claim 7 wherein said means for consecutively changing states of said indivudual indicator elements activates a single individual indicator element for each digital value of said indicator element and deactivates any other previously activated indicator elements, whereby each single indicator element when activated provides an indication of the digital value of said output signal.

* * * * *